United States Patent [19]

Kohara et al.

[11] Patent Number: 5,034,482

[45] Date of Patent: Jul. 23, 1991

[54] PROCESS FOR PRODUCING POLYMER BY RING-OPENING POLYMERIZATION

[75] Inventors: Teiji Kohara, Kawasaki; Toshihide Murakami, Yokohama; Masayoshi Oshima, Niiza; Tadao Natsuume, Yokohama, all of Japan

[73] Assignee: Nippon Zeon Co., Ltd., Tokyo, Japan

[21] Appl. No.: 553,849

[22] Filed: Jul. 18, 1990

[30] Foreign Application Priority Data

Jul. 28, 1989 [JP] Japan ................... 1-193848

[51] Int. Cl.$^5$ .................. C08F 4/44; C08F 136/00
[52] U.S. Cl. ........................ 526/114; 526/283
[58] Field of Search ........... 526/90, 114; 525/297

[56] References Cited

FOREIGN PATENT DOCUMENTS 2502748  7/1976  Fed. Rep. of Germany .
4120111 11/1966  Japan .

OTHER PUBLICATIONS

CA 66:116155w, 1967.
Takao Oshika and Hiroyoshi Tabuchi, Ring-opening Polymerization of Norbornene and Its Derivatives by $MoCl_5$, $WCl_6$, and $ReCl_5$, Bulletin of the Chemical Society of Japan, vol. 41, 211–217 (1968).

Primary Examiner—Joseph L. Schofer
Assistant Examiner—Wu C. Cheng
Attorney, Agent, or Firm—Armstrong, Nikaido, Marmelstein, Kubovcik & Murray

[57] ABSTRACT

A process for producing a polymer by ring-opening polymerization of a norbornene-type monomer, which comprises starting the ring-opening polymerization in the presence of a Ziegler-type catalyst consisting essentially of an organometallic compound of a metal belonging to the groups I to III of the periodic table and titanium tetrahalide, carrying out the ring-opening polymerization until the norbornene-type monomer shows a conversion ratio of not less than 60%, and then adding a tungsten and/or molybdenum-based metathesis catalyst to the polymerization reaction system to continue the ring-opening polymerization.

20 Claims, No Drawings

PROCESS FOR PRODUCING POLYMER BY RING-OPENING POLYMERIZATION

BACKGROUND OF THE INVENTION

1. Field of the Invention

This invention relates to a process for producing a polymer by ring-opening polymerization of a norbornene-type monomer, more specifically to a process for producing a polymer having a limited distribution of molecular weight by ring-opening polymerization at high yields.

2. Related Art

In recent years, attention has been paid to hydrogenated products of polymers produced by ring-opening polymerization of norbornene-type monomers such as tetracyclododecene, dicyclopentadiene (DCP), tricyclopentadiene, etc., as an optical material for use in an optical disk, optical lens, transparent film, etc. (e.g. JP-A-60-26024, JP-A-1-24826, WO80/01953, EP303,246, EP317,262). The reasons therefor are that such hydrogenated products are excellent in transparency and heat resistance and hardly susceptible to water and that they have comparatively small birefringence and excellent moldability.

The ring-opening polymerization of a norbornene-type monomer is carried out, in general, in the presence of (1) a catalyst system consisting of an organometallic compound such as an organoaluminum compound and a tungsten and/or molybdenum-based metathesis catalyst (e.g. U.S. Pat. No. 3,557,072) or (2) a catalyst system containing an organometallic compound such as an organoaluminum compound and a transition-metal compound such as titanium tetrahalide (e.g. JP-B-41-20111, DE-A-2,502,748).

However, in the case of the ring-opening polymerization using the above (1) catalyst system, the resultant polymer has a broad distribution of molecular weight and therefore has large birefringence, in spite of an advantage that the polymer can be obtained at such high yields that the residual monomer is hardly present in the reaction system when the reaction has completed.

In the case of the ring-opening polymerization using the above (2) catalyst system, the molecular weight distribution of a resulting polymer can be easily controlled. However, with a decreasing concentration of a monomer in the reaction system, the polymer formation ratio decreases markedly. Even if the polymerization is started with a high monomer concentration, the polymer formation ratio decreases as the monomer concentration decreases with the progress of the polymerization reaction. Hence, the polymer formed by the ring-opening polymerization of the present catalyst system cannot be obtained at high yields. Moreover, a large amount of an unreacted monomer remains in the reaction system when the polymerization has completed. It is very difficult to remove this remaining monomer at a polymer-isolation step. And, the unreacted monomer remaining in the polymer causes voids, a phenomenon of haze on a molded article surface called flash or silver lines called silver streaks.

SUMMARY OF THE INVENTION

It is an object of this invention to provide a process for ring-opening polymerization of a norbornene-type monomer, in which a polymer having a limited distribution of molecular weight can be obtained, the concentration of the monomer remaining in the reaction system when the polymerization has completes is very low, and the polymer can be produced at high yields.

The present inventors made an intensive study in order to overcome the above prior art problems, and found that the above object can be achieved by a combination process of a first step (anterior polymerization step) of starting ring-opening polymerization of a norbornene-type monomer in the presence of a Ziegler-type catalyst consisting essentially of an organometallic compound of a metal belonging to the groups I to III of the periodic table and titanium tetrahalide and a second step (posterior polymerization step) of continuing the ring-opening polymerization by adding a tungsten and/or molybdenum-based metathesis catalyst to the reaction system during the reaction.

According to this invention, therefore, there is provided a process for producing a polymer by ring-opening polymerization of a norbornene-type monomer, which comprises starting the ring-opening polymerization in the presence of a Ziegler-type catalyst consisting essentially of an organometallic compound of a metal belonging to the groups I to III of the periodic table and titanium tetrahalide, carrying out the ring-opening polymerization until the norbornene-type monomer shows a conversion ratio of not less than 60%, and then adding a tungsten and/or molybdenum metathesis catalyst to the reaction system to continue the ring-opening polymerization.

DETAILED DESCRIPTION OF PREFERRED EMBODIMENTS

This invention will be detailed hereinbelow.

Norbornene-type monomer

Examples of the norbornene-type monomer are norbornene and alkyl, alkylidene and/or aryl-substituted compounds thereof such as 5-methyl-2-norbornene, 5,6-dimethyl-2-norbornene, 5-ethyl-2-norbornene, 5-butyl-2norbornene, 5-ethylidene-2-norbornene, 5-phenyl-2-norbornene; dicyclopentadiene, 2,3-dihydrodicyclopentadiene and substituted compounds of these with alkyl such as methyl, ethyl, propyl, butyl or the like; dimethanooctahydronaphthalene and alkyl, alkylidene and/or aryl-substituted compound thereof such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-phenyl1,4:5,8-dimethano-1,4,4a,5,6,7,8,8a-octahydronaphthalene, etc.; trimers and tetramers of cyclopentadiene such as 4,9:5,8-dimethano-3a,4,4a,5,8,8a,9,9a-octahydro-1H-benzoindene, 4,11:5,10:6,9-trimethano-3a,4,4a,5,5a,6,-9,9a,10,10a, 11,11a-dodecahydro-1H-cyclopentaanthrace, etc.

The norbornene-type monomer may have a polar substituent or a substituent having a metal atom. Examples of such a substituent are halogen atoms such as chlorine, bromine and fluorine; ester-type moieties such as methoxycarbonyl, ethoxycarbonyl and acetoxy groups; a cyano group; a pyridyl group; silyl groups such as trimethylsilyl, triethylsilyl and dimethylmonochlorosilyl groups; and the like.

These norbornene-type monomers may be used alone or in combination. In order to impart excellent heat resistance to the polymer formed by ring-opening polymerization and the hydrogenation product thereof by adjusting the glass transition point (Tg) thereof to not less than 100° C., tetracyclic or pentacyclic compounds of these norbornene-type monomers are used alone or as a main component in combination with bicyclic or tricyclic monomers. In view of birefringence in particular, a homopolymer or copolymer of lower alkyl-substituted or alkenyl-substituted tetracyclic compounds is preferable. Above all, a homopolymer of a substituted compound having a substituent having 1 to 3 carbon atoms or a copolymer containing as a copolymerizing component, not less than 50% by weight, preferably not less than 70% by weight, of said substituted compound is preferred.

And, as a copolymerizing component, it is possible to use other cycloolefins such a cyclopropene, cyclobutene, cyclopentene, cycloheptene, cyclooctene, 5,6-dihydrodicyclopentadiene, etc., in such an amount that does not impede the object of this invention, usually in the range of not more than 30% by weight.

Further, as a molecular-weight regulator, noncyclic olefins may be used in a small amount, usually in the range of up to 10 mol %. In particular, α-olefins such as 1-butene, 1-pentene, 1-hexene, etc., are preferred.

Ring-opening polymerization catalyst

Ziegler-type catalyst (a) Organometallic compounds

Examples of the organometallic compound of a metal belonging to the groups I to III of the periodic table, used in this invention, are organoaluminum compounds, organolithium compounds, organomagnesium compounds, etc., as are described in JP-B-41-20111, DE-A-2502748 and U.S. Pat. No. 3,557,072. Of these compounds, organoaluminum compounds are preferred.

Examples of the organoaluminum compounds are trimethylaluminum, triethylaluminum, tri-n-propylaluminum, triisopropylaluminum, triisobutylaluminum, trihexylaluminum, trioctylaluminum, triphenylaluminum, tribenzylaluminum, diethylaluminum monochloride, di-n-propylaluminum monochloride, diisobutylaluminum monochloride, di-n-butylaluminum monochloride, diethylaluminum monobromide, diethylaluminum monoiodide, diethylaluminum monohydride, di-n-propylaluminum monohydride, diisobutylaluminum monohydride, methylaluminum sesquichloride, ethylaluminum sesquibromide, isobutylaluminum sesquichloride, ethylaluminum dichloride, ethylaluminum dibromide, propylaluminum dichloride, isobutylaluminum dichloride, ethylaluminum dibromide, ethylaluminum diiodide, lithiumaluminum tetra-n-butyl, etc.

Examples of the organolithium compounds are methyllithium, ethyllithium, n-butyllithium, n-hexyllithium, etc.

Examples of the organomagnesium compounds are diethylmagnesium, methylmagnesium iodide, ethylmagnesium bromide, methylmagnesium bromide, n-propylmagnesium chloride, t-butylmagnesium chloride, allylmagnesium chloride, phenylmagnesium bromide, etc.

(b) Titanium tetrahalide

Specific examples of the titanium tetrahalide are titanium tetrachloride, titanium tetrabromide, etc.

(c) Amine-type activator

The Ziegler-type catalyst of this invention may be used in combination with an amine-type activator.

Examples of the amine-type activator are aliphatic, alicyclic or aromatic tertiary amines and heterocyclic amines. Specific examples thereof are trimethylamine, triethylamine, tripropylamine, tri-n-butylamine, dimethylaniline, pyridine, α-picoline, γ-picoline, 2,6-lutidine, etc., (DE-A-2,502,748, WO89/01953).

Metathesis catalyst

Examples of the tungsten and/or molybdenum-based metathesis catalyst are halides, oxyhalides or oxyorganic compounds of these metals. Specific examples thereof are tungsten hexachloride, tungsten (IV) oxychloride, tungsten tetrachloride, molybdenum pentachloride, acetylacetonatomolybdenum oxide, etc.

Conditions for ring-opening polymerization

Solvent

The ring-opening polymerization of the norbornene-type monomer in this invention may be carried out in the absence of a solvent. In general, however, it is carried out in an inert organic solvent.

As the solvent, hydrocarbon solvents are preferred, and of these solvents, cyclic hydrocarbon solvents having the excellent power to dissolve the polymers being formed by the ring-opening polymerization are particularly preferred.

Specific examples thereof are aromatic hydrocarbons such as benzene, ethylbenzene, toluene, xylene, etc.; aliphatic hydrocarbons such as n-pentane, hexane, heptane, etc.; alicyclic hydrocarbons such as cyclopentane, cyclohexane, methylcyclohexane, dimethylcyclohexane, decalin, etc.; hydrocarbon halides such as methylene dichloride, dichloroethane, dichloroethylene, tetrachloroethane, chlorobenzene, dichlorobenzene, trichlorobenzene, etc. These may be used in combination.

The amount of the solvent, based on 1 part by weight of the monomer, is usually 1 to 20 parts by weight, preferably 2 to 10 parts by weight.

Polymerization temperature

The temperature conditions for the ring-opening polymerization are not specially limited, and any temperature between −20° C. and 100° C., usually between 0° C. and 100° C., preferably between 10° C. and 80° C. is selected.

Pressure for polymerization system

The pressure for the polymerization is 0 to 50 kg/cm$^2$, usually ordinary pressure to 10 kg/cm$^2$, preferably not more than 5 kg/cm$^2$.

Atmosphere for polymerization system

The ring-opening polymerization is usually carried out in atmosphere of an inert gas such as nitrogen, argon, or the like.

Addition of ring-opening polymerization catalysts

The amounts of the ring-opening polymerization catalysts are as follows. Concerning the amount of each of the components of the Ziegler-type catalyst per 100 moles of the monomer, the amount of the (a) organometallic compound is 0.1 to 10 moles, preferably 0.5 to 5 moles, the amount of the (b) titanium tetrahalide per 100 moles of the monomer is 0.05 to 5 moles, preferably 0.25 to 2.5 moles, and the amount of the (c) amine-type activator per 100 moles of the monomer, if used, is 0.2 to 20 moles, preferably 1 to 10 moles. And, the amount of the metathesis catalyst per 100 moles of the monomer is 0.005 to 1 mole, preferably 0.01 to 0.5 mole.

Further, the proportions of each of the above components (a), (b) and (c) and the metathesis catalyst are as follows. Per mole of the (a) organometallic compound, the proportion of the (b) titanium tetrahalide is 0.05 to 1 mole, preferably 0.1 to 0.9 mole, that of the (c) amine-type activator 0.5 to 10 moles, preferably 1 to 5 moles, and that of the metathesis catalyst is 0.002 to 0.5 mole, preferably 0.01 to 0.1 mole.

In this invention, at first, the ring-opening polymerization of the norbornene-type monomer is started in the presence of the Ziegler-type catalyst, and in course of the reaction, the tungsten and/or molybdenumbased metathesis catalyst is added to the reaction system to continue the ring-opening polymerization.

If these catalysts are added in some other order than above, the object of this invention cannot be achieved.

When only the Ziegler-type catalyst is used, or when the metathesis catalyst is not added in the posterior polymerization step, the conversion ratio of the monomer is as low as about 90% at best, and the polymer cannot be obtained at high yields. When the ring-opening polymerization is carried out in the presence of the metathesis catalyst only, the resultant polymer has a broad distribution of molecular weight. And, even if the Ziegler-type catalyst is added after the ring-opening polymerization has been started by using the metathesis catalyst, it is impossible to control the molecular weight distribution to a preferred range. Further, even if the ring-opening polymerization is started in the presence of both the Ziegler-type catalyst and the metathesis catalyst, the result is none the better.

The metathesis catalyst in the posterior polymerization step is added at a time when the conversion ratio of the norbornene-type monomer becomes not less than 60%, preferably not less than 70% after the ring-opening polymerization is started in the presence of the Ziegler-type catalyst, preferably in the presence of $R_3Al$/$TiCl_4$/amine activator. If the metathesis catalyst is added when the conversion ratio is too low, it is difficult to control the molecular weight and molecular weight distribution of the resulting polymer. The upper limit of the conversion ratio in the anterior polymerization step is about 90%.

After the addition of the metathesis catalyst, the ring-opening polymerization in the posterior polymerization step is continued until the final conversion ratio becomes, preferably, not less than 95%.

Polymer formed by ring-opening polymerization

The polymer produced by ring-opening polymerization according to this invention has a number average molecular weight (Mn) of 10,000 to 200,000, preferably 20,000 to 100,000, a molecular distribution (Mw/Mn) of not more than 3, preferably 2.5. When the polymer is hydrogenated and used as an optical material such as an optical disk, the polymer having a number average molecular weight (Mn) of 20,000 to 40,000 is the most preferred.

When the number average molecular weight is larger than the above range, the polymer has large birefringence and poor moldability. When it is smaller than the above range, the polymer has poor mechanical strength. And, when the molecular weight distribution (Mw/Mn) is greater than the above range, the polymer has large birefringence.

The above-specified molecular weight and molecular weight distribution of the polymer are according to gel-permeation chromatography ("GPC" hereinbelow) analysis using cyclohexane as a solvent.

The polymer formed by the ring-opening polymerization is hydrogenated according to an ordinary method and can be suitably used as an optical material for an optical disk, optical lens, transparent film, and the like.

EXAMPLES

This invention will be explained more specifically by reference to Examples. However, this invention shall not be limited only thereto.

EXAMPLE 1

52.2 g (300 mmol) of 6-methyl-1,4:5,8-dimethano-1,4,4a,5,6,7,8,8a-octahydronaphthalene ("MTD" hereinbelow) was dissolved in 150 ml of cyclohexane. And, as a polymerization solvent, 6.84 g (9.0 mmol) of a solution of 15% by weight of triethylaluminum in cyclohexane, 2.7 g (27 mmol) of triethylamine and 5.7 g (6.0 mmol) of a solution of 20% by weight of titanium tetrachloride in cyclohexane were added in the presence of 0.25 g (3.0 mmol) of 1-hexene as a molecular weight regulator at 30° C. to start ring-opening polymerization.

When 30 minutes passed after the polymerization was started, the conversion ratio reached 86%. At this time, 6.6 g (0.15 mmol) of a solution of 0.9% by weight of tungsten hexachloride in cyclohexane was added to continue the polymerization further for 30 minutes.

The reaction was stopped by adding 4 ml of methanol, and the reaction solution was poured into 5 l of isopropyl alcohol to coagulate the resultant polymer. The coagulated polymer was dried under vacuum to give 50.6 g of a polymer formed by the ring-opening polymerization. The yield of the polymer was 97%.

During the polymerization, when 30 minutes passed after the titanium tetrachloride was added and when 30 minutes passed after the tungsten hexachloride was added, 2 ml each of samples of the polymerization solution were taken and subjected to GPC analysis to measure molecular weights, molecular weight distributions and conversion ratios of the monomer to the polymer.

GPC analysis conditions: Measurements were made with HLC802L (supplied by TOSOH CORPORATION) having TSK gel G5000H-G4000H column at a temperature of 38° C. and a flow rate of 1.0 ml/minute by using toluene or cyclohexane as a solvent. Toluene was used as a solvent for the measurement of the molecular weights and molecular weight distributions, and cyclohexane for the conversion ratios.

Table 1 shows the results.

Examples 2–4

Example 1 was repeated except that the proportions of the Ziegler-type catalyst and metathesis catalyst were changed as shown in Table 1. Table 1 shows the results.

Example 5

Example 1 was repeated except that the tungsten hexachloride was replaced with 0.30 mmol of molybdenum pentachloride. Table 1 shows the results.

Example 6

Example 1 was repeated except that the monomer was changed to a mixture of MTD (240 mmol) with norbornene ("NB" hereinbelow) (60 mmol) and that the proportions of the catalysts were changed as shown in Table 1. Table 1 shows the results.

Comparative Example 1

Ring-opening polymerization of MTD was started in the presence of a Ziegler-type catalyst shown in Table 1, and no metathesis catalyst was added in a posterior polymerization step. The results were that when 1 hour of the polymerization passed, the conversion ratio was as low as 89% and a large amount of the monomer remained in the reaction system.

Comparative Example 2

Ring-opening polymerization of MTD was carried out in the presence of triethylaluminum (6.0 mmol) and tungsten hexachloride (0.90 mmol). The resultant polymer had a large molecular weight and a broad distribution of molecular weight, and it was not possible to control them to the desired ranges. Table 1 shows the results.

Comparative Example 3

Ring-opening polymerization of MTD was carried out by simultaneously adding a Ziegler-type catalyst and a metathesis catalyst as shown in Table 1. The resultant polymer had a large molecular weight and a broad distribution of molecular weight, and it was not possible to control them to the desired ranges. Table 1 shows the results.

Example 7

Example 1 was repeated except that 6-ethyl-1,4:5,8-dimethano-1,4,4a,5,6,7,8,8a-octahydronaphthalene (ETD) was used as the norbornene-type monomer. After the anterior polymerization step (30 minutes after), the conversion ratio was 85%, Mn was $2.2 \times 10^4$, and Mw/Mn was 2.05. After the posterior polymerization step (another 30 minutes after), the conversion ratio was 99%, MN was $2.4 \times 10^4$, and Mw/Mn was 2.21.

According to this invention, there is provided a process for producing a polymer by ring-opening polymerization of a norbornene-type monomer at high yields, which can impart the resulting polymer with a narrow distribution of molecular weight, and which achieves a very low concentration of the monomer remaining in the reaction system when the polymerization has finished. The hydrogenated product produced by hydrogenating the polymer obtained according to this invention has excellent moldability and small birefringence. Therefore, the hydrogenated product is suitably usable as optical materials for optical disks, optical lenses, transparent films, and the like.

What is claimed is:

1. A process for producing a polymer by ring-opening polymerization, which comprises starting ring-opening polymerization of a monomer containing norbornene group in the presence of a Ziegler catalyst consisting essentially of an organometallic compound of a metal belonging to the groups I to III of the periodic table and titanium tetrahalide, carrying out the ring-opening polymerization until the monomer containing norbornene group shows a conversion ratio of not less than 60%, and then adding a tungsten and/or molybdenum-based metathesis catalyst to the polymerization reaction system to continue the polymerization.

2. A process according to claim 1, wherein the tungsten and/or molybdenum-based metathesis catalyst is added when the monomer containing norbornene groups shows a conversion ratio of between about 60% to about 90%.

3. A process according to claim 1, wherein the ring-opening polymerization after the methathesis catalyst has been added is continued until the monomer containing norbornene group shows a final conversion ratio of not less than 95%.

4. A process according to claim 1, wherein the ring-opening polymerization is carried out in the presence of a molecular weight regulator.

TABLE 1

| | | Monomer | | Solvent | Molecular weight regulator | Ziegler-type catalyst | | | Metathesis catalyst | |
|---|---|---|---|---|---|---|---|---|---|---|
| | | MTD (mmol) | NB (mmol) | Cyclohexane (ml) | 1-hexene (mmol) | Triethyl-aluminum (mmol) | Triethyl-amine (mmol) | Titanium tetrachloride (mmol) | Tungsten hexachloride (mmol) | Molybdenum pentachloride (mmol) |
| Example | 1 | 300 | — | 150 | 3.0 | 9.0 | 27.0 | 6.0 | 0.15 | — |
| | 2 | 300 | — | 150 | 2.1 | 8.1 | 21.0 | 5.1 | 0.30 | — |
| | 3 | 300 | — | 150 | 4.2 | 4.2 | 10.5 | 2.4 | 0.30 | — |
| | 4 | 300 | — | 150 | 1.5 | 9.0 | 27.0 | 6.6 | 0.15 | — |
| | 5 | 300 | — | 150 | 3.0 | 9.0 | 27.0 | 6.0 | — | 0.30 |
| | 6 | 240 | 60 | 150 | 4.2 | 4.2 | 10.5 | 2.0 | 0.30 | — |
| Comparative Example | 1 | 300 | — | 150 | 1.0 | 18.0 | 40.0 | 12.0 | — | — |
| | 2 | 300 | — | 300 | 30 | 6.0 | — | — | 0.90 | — |
| | 3 | 300 | — | 150 | 3.0 | 9.0 | 27.0 | 6.0 | 0.15 | — |

| | | 1st step (anterior polymerization step) | | | 2nd step (posterior polymerization step) | | |
|---|---|---|---|---|---|---|---|
| | | Conversion ratio (%) | Number average molecular weight (MN) | Molecular weight distribution (Mw/Mn) | Conversion ratio (%) | Number average molecular weight (Mn) | Molecular weight distribution (Mw/Mn) |
| Example | 1 | 86 | $1.9 \times 10^4$ | 2.05 | >99 | $2.1 \times 10^4$ | 2.11 |
| | 2 | 81 | $2.5 \times 10^4$ | 2.01 | >99 | $2.8 \times 10^4$ | 2.08 |
| | 3 | 74 | $3.0 \times 10^4$ | 2.00 | 98 | $3.2 \times 10^4$ | 2.17 |
| | 4 | 88 | $2.2 \times 10^4$ | 2.11 | >99 | $2.3 \times 10^4$ | 2.10 |
| | 5 | 85 | $1.9 \times 10^4$ | 2.01 | 96 | $2.2 \times 10^4$ | 2.10 |
| | 6 | 70 | $2.6 \times 10^4$ | 2.09 | >99 | $3.0 \times 10^4$ | 2.18 |
| Comparative Example | 1 | — | — | — | 89 | $2.5 \times 10^4$ | 2.19 |
| | 2 | — | — | — | 95 | $4.8 \times 10^4$ | 4.6 |
| | 3 | — | — | — | 98 | $3.6 \times 10^4$ | 3.9 |

(Note) In Comparative Examples 1 to 3, ring-opening polymerization was started by adding a Ziegler-type catalyst and a metathesis catalyst at the same time, and the polymerization was continued as one step.

5. A process according to claim 1, wherein the polymer produced by the ring-opening polymerization has a number average molecular weight (Mn) of 10,000 to 200,000 and an Mw/Mn ratio of not more than 3.

6. A process according to claim 1, wherein the Ziegler catalyst consisting essentially of 0.1 to 10 moles of the organometallic compound and 0.05 to 5 moles of the titanium tetrahalide and 0.005 to 1 mole of the metathesis catalyst are used per 100 moles of the monomer.

7. A process according to claim 1, wherein the Ziegler catalyst is used in combination of 0.2 to 20 moles, per 100 moles of the monomer, of an aminetype activator.

8. A process according to claim 1, which comprises using, per mole of the organometallic compound, 0.05 to 1 mole of the titanium tetrahalide, 0.5 to 10 moles the amine-containing activator and 0.002 to 0.5 mole of the metathesis catalyst.

9. A process according to claim 1, where the ring-opening polymerization is carried out in the presence of a solvent and at a temperature between −20° C. and 100° C.

10. A process according to claim 6, wherein the organometallic compound is an Li, Mg or Al compound.

11. A process according to claim 10, wherein the organometallic compound is an Al compound.

12. A process according to claim 6, wherein the titanium tetrahalide is titanium tetrachloride or titanium tetrabromide.

13. A process according to claim 7, wherein the amine-containing activator is an aliphatic, alicyclic or aromatic tertiary amine or a heterocyclic amine.

14. A process according to claim 6, wherein the metathesis catalyst is a halide, oxyhalide or oxyorganic compound of tungsten and/or molybdenum.

15. A process according to any one of claims 1 to 14, wherein the polymer has a number average molecular weight (Mn) of 20,000 to 100,000 and a number average molecular weight/weight average molecular weight (Mw) ratio (Mn/Mw) of not more than 2.5.

16. A process according to claim 1, wherein the Ziegler catalyst is a catalyst formed of $R_3Al/TiCl_4$/amine-containing activator and the metathesis catalyst is added when the conversion ratio becomes 70 to 90%.

17. A process according to claim 1, wherein the monomer contains not less than 50% by weight of tetracyclic and/or pentacyclic compounds.

18. A process according to claim 17, wherein the monomer is a nonsubstituted compound or a hydrocarbon-substituted compound.

19. A process according to claim 18, wherein the hydrocarbon-substituted compound is alkyl or alkylidene-substituted one.

20. A process according to claim 18, wherein the monomer is a compound substituted with an aryl group, halogen, an ester-containing moiety, an ether-containing moiety, or a silyl group.

* * * * *